Sept. 5, 1939.  H. G. KAMRATH  2,171,752
AIR CLEANER
Filed Dec. 26, 1935
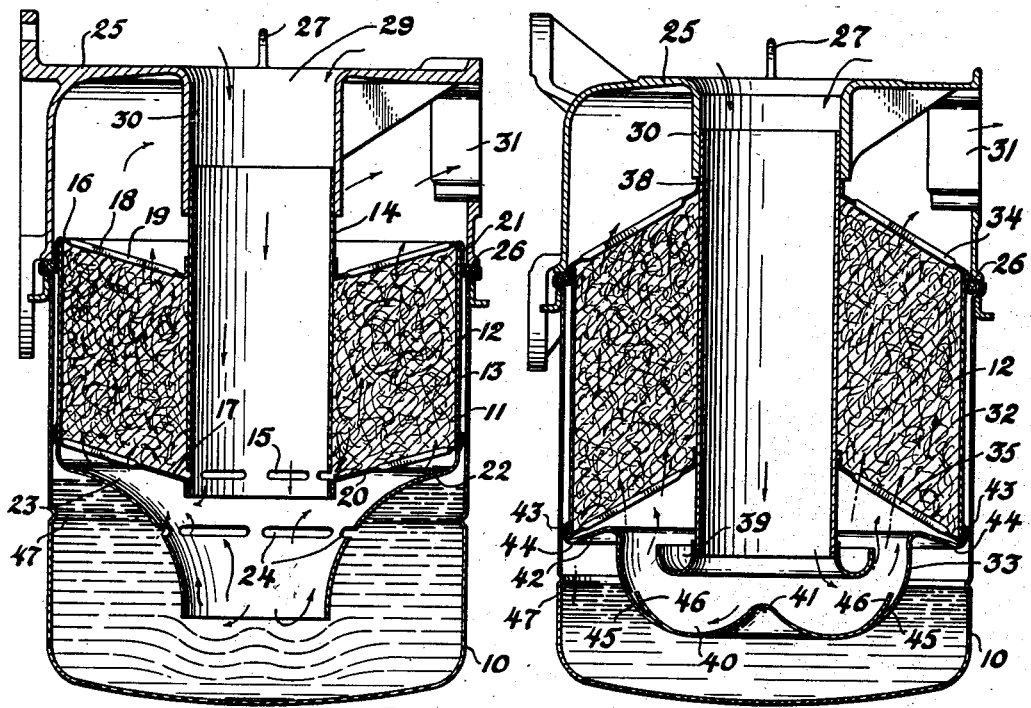
Fig. 1
Fig. 2
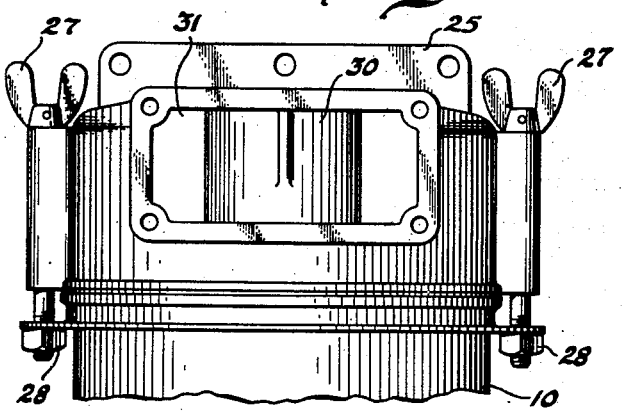
Fig. 3
Fig. 4
Fig. 5
Inventor
Herbert G. Kamrath
By Blackmore, Spencer & Flint
Attorneys Patented Sept. 5, 1939

2,171,752

UNITED STATES PATENT OFFICE 2,171,752

AIR CLEANER

Herbert G. Kamrath, Flint, Mich., assignor to General Motors Corporation, Detroit, Mich., a corporation of Delaware Application December 26, 1935, Serial No. 56,141

7 Claims. (Cl. 183—15)

This invention relates to air cleaners in which the current of air which passes therethrough picks up liquid from a reservoir and carries it into a filter element.

The principal object of the invention is to provide an air cleaner of the type described which is so constructed that while it is operating liquid will be continuously picked up from the reservoir by the current of air, circulated through the filter element and returned to the reservoir so that the filter element will be kept moist and clean and yet not oversupplied with liquid.

For a better understanding of the nature and objects of this invention, reference is made to the following specification wherein there are described the preferred embodiments of the invention which are illustrated in the accompanying drawing.

In the accompanying drawing:

Figure 1 is a vertical section through an air cleaner in which my invention is embodied.

Figure 2 is a vertical section through another air cleaner in which my invention is embodied.

Figure 3 may be considered a side elevation of the upper end of the air cleaner shown in Figure 1 or a similar view of the air cleaner shown in Figure 2.

Figure 4 is a fragmentary perspective view of the baffle which is incorporated in the air cleaner shown in Figure 2.

Figure 5 is a fragmentary plan view of the upper end wall of the filter element of the air cleaner shown in Figure 1.

The air cleaner shown in Figure 1 includes a deep cup-shaped body 10 which is filled with oil or some other suitable liquid to about the level of the bead 47 before the air cleaner is put into operation. Into the upper end of the body 10, to a point somewhat above the level of the oil therein, there extends a hollow annular member 11 which is filled with a suitable, preferably metal, filter medium 12. The member 11 includes an imperforate cylindrical element 13, which is slightly smaller in diameter than the body 10, and a tubular element 14 which is co-axial with the element 13 and in whose lower end there is provided an annular series of openings 15. The upper end of the element 13 is connected to the element 14 well below its upper end by a downwardly and inwardly inclined annular element 16. The lower end of the element 13 is connected to the element 14 at the lower edges of the openings 15 by another downwardly and inwardly annular inclined element 17. In the element 16, there is provided an annular opening 18 which extends from near the inner to near the outer edge thereof and is bridged by a series of bars 19 which are integral with the element. The element 17 is similar to the element 16 except in that its imperforate inner rim 20 is much wider. The filter element 11—12 is supported on the upper edge of the body 10 through an annular element 21 which is integral with the element 16.

From the lower end of the filter element 11—12, there depends a generally funnel-shaped baffle 22 whose upper end snugly embraces and is secured to the lower end of the filter element and whose lower end terminates well below the level of the liquid within the body 10. The baffle 22 is spaced from the lower end of the tube 14 and from the lower end wall 17 of the filter element except at its outer edge so as to provide a passage 23 through which air may pass from the lower end of the tube 14 into the lower end of the filter element. In the baffle 22, somewhat below the level of the liquid in the body 10, there is provided an annular series of openings 24.

On a compressible gasket 26 which is seated on the outer edge of the upper end wall 16 of the filter element, there is seated the lower edge of an inverted generally cup-shaped cover 25 which is secured to the body 10 by thumbscrews and nuts 27 and 28. In the upper end of the cover 25, there is provided an air intake opening 29 which is encircled by an inwardly extending collar 30 which snugly embraces the upper end of the tube 14. In the side wall of the cover 25, there is provided an air discharge opening 31.

The air cleaner shown in Figure 2 does not differ materially from the air cleaner shown in Figure 1 except in the construction of the filter element 32 and the baffle 33 which depends therefrom. The baffle 33 consists of a generally bowl-shaped body 40 whose lower portion is immersed in the liquid within the bottom of the body 10 and through which below the level of the liquid there extend an annular series of openings 45 which are formed by striking out tongues 46. In the center of the bottom of the body 10, there is formed an upwardly projecting "air-splitter" 41. On the upper edge of the body 40, there is formed an outwardly and downwardly inclined rim 42. On the outer edge of the rim 42, there is formed a flange 43 which embraces and is secured to the lower end of the filter element 32 with the rim 42 spaced vertically from the lower wall 35 of the filter element. Through the outer edge of the rim 42 within the flange 43, there extend an annular series of openings 44. The filter element 32, itself, is generally similar to the filter element 11—12 shown in Figure 1 but its end walls 34 and 35 are upwardly and inwardly instead of downwardly and inwardly inclined and the annular openings in both of the end walls extend from near the outer to near the inner edges thereof. Moreover, the tube 38 which is imperforate and extends into but terminates short of the bottom of the baffle 33 carries on its lower end an annular, generally trough-shaped element 39 which serves to increase the velocity and decrease the pressure of the current of air which travels through the air cleaner opposite the openings 45.

The air cleaners shown in the drawing were designed for installation on internal combustion engines with the air discharge openings 31 connected to the air intake orifices of the carburetors thereof. When one of the air cleaners is so installed and the engine is operating, the suction of the engine draws air into the opening 29 and, thence, through and out of the lower end of the tube 14 (or 38).

After the air passes out of the lower end of the tube 14 (or 38), it impinges against the surface of the liquid within the baffle 23 (or 33) or, in the case of the air cleaner shown in Figure 2, against the bottom of the baffle 33, and then, so to speak, turns itself inside out, reverses its direction of travel, and flows over the surface of the baffle into the filter element 11—12 (or 32) whence it passes, through the opening 31, into the carburetor and the cylinders of the engine.

In the case of the air cleaner shown in Figure 1 some of the dirt carried by the air comes into contact with the surface of the liquid within the baffle 22 and is caught and retained thereby. The pressure of the air on the surface of the liquid within the baffle 22 lowers the level thereof and raises the level of the liquid without the baffle and, consequently, liquid is forced through the openings 24 into the current of air which is traveling upwardly over the surface of the baffle 22. Part of this liquid travels downwardly and carries with it dirt from the air into the body of liquid in the bottom of the body 10 but another portion is picked up by the upwardly traveling current of air and carried by it into the filter element 11—12. The liquid which is carried into the filter element is deposited on the filter medium 12 in the form of a thin coating which catches and retains the dirt which remains in the air. Because the portion of the filter element directly above the ledge 20 is sheltered from the current of air which travels upwardly through the filter element and the openings 15 are located in a zone of low pressure in the tube 14, the excess of liquid beyond that required to keep the filter medium properly moistened, together with the dirt carried thereby, gravitates and is drawn down onto the ledge 20 whence it passes through the openings 15 into the tube 14 and is carried by the descending current of air into the body of liquid within the bottom of the body 10.

In the case of the air cleaner shown in Figure 2, each time the engine is started, the current of air which passes out of the lower end of the tube 38 first sweeps the volume of liquid which accumulates within the body 40 of the baffle 33 whenever the engine stops into the filter element 32. This liquid is, of course, deposited on the filter medium 12 in the form of a thin coating which catches and retains the dirt in the air. Thereafter, gravity and the suction imposed on the openings 45 by the current of air which travels upwardly over the inner surface of the baffle tend to "refill" the body of the baffle with liquid from the bottom of the body 10 but this tendency is opposed by the pressure of the air and liquid, consequently, enters the body of the baffle relatively slowly during operation of the engine. While the engine is operating, the liquid which enters the body of the baffle, is as fast as it enters, picked up by the current of air which is traveling upwardly over the inner surface of the baffle and thereby carried into the filter element and deposited on the filter medium. Because the portion of the filter element directly above the rim 42 is sheltered from the current of air which travels upwardly through the filter element, the excess of liquid beyond that required to keep the filter medium properly moistened, together with the dirt carried thereby, gravitates down onto the rim 42 whence it drains through the openings 44 into the body of liquid within the body 10.

During continued operation of the air cleaners shown in the drawing, liquid is returned from the filter element to the bottom of the body 10 as fast as it enters the filter element and the dirt which is carried by the liquid settles to the bottom of the body of liquid in the bottom of the body 10. Consequently, since the liquid which is picked up by the air is withdrawn from a zone near the upper surface of the body of liquid within the body 10, the dirt-laden coating of liquid on the filter medium is continuously replaced by clean liquid during operation of the air cleaners.

It will, of course, be understood that, when the screws 27 are unfastened, the cover 25 may be separated from the body 10 and the filter element 11—12 (or 32), and the filter element may be removed from the body 10. This feature, of course, facilitates cleaning and inspection of the air cleaners shown in the drawing.

I claim:

1. In an air cleaner, a generally cup-shaped body which is partly filled with a liquid, a cover for the body, air intake and discharge orifices in the cover, a tube which communicates with the air intake orifice and terminates above the surface of the liquid, a perforated member which bridges the space between the tube and the body and is imperforate near the tube, filtering material between the member and the air discharge orifice, and a generally funnel-shaped baffle which depends and is spaced vertically from the member and whose lower end is immersed in the liquid, the tube having an opening in it above the level of the imperforate portion of the member and the baffle an opening in it below the level of the liquid.

2. In an air cleaner, a generally cup-shaped body which is partly filled with a liquid, a cover for the body, air intake and discharge orifices in the cover, a tube which communicates with the air intake orifice and terminates above the surface of the liquid, a perforated member which bridges the space between the tube and the body, filtering material between the member and the air discharge orifice, a generally cup-shaped baffle which depends from the member and whose bottom is immersed in the liquid, and an outwardly and downwardly inclined rim on the baffle which is spaced vertically from the member, the rim having an opening in its outer edge and the baffle an opening in it below the level of the liquid.

3. In an air cleaner, a generally cup-shaped body which is partly filled with a liquid, a cover for the body, air intake and discharge orifices in the cover, a tube which communicates with the air intake orifice and terminates above the surface of the liquid, a perforated member which bridges the space between the tube and the body, filtering material between the member and the air discharge orifice, a baffle which depends and is vertically spaced from the member with its outer margin generally parallel thereto and its lower end immersed in the liquid, and an opening through which liquid is supplied to the current of air which travels through the air cleaner in a portion of the baffle which is traversed by the air in the course of its travel from the tube to the filter element, there being an opening through which liquid carried by the current of air into the filtering material may be returned to the bottom of the body.

4. In an air cleaner, a body which is partly filled with a liquid, air intake and discharge orifices in the body, a generally cylindrical member which is spaced radially from the side wall of the body and divides the interior of the body into a passage through which air is conducted from the air intake orifice downwardly toward the surface of the liquid and a passage through which air is conducted upwardly from the surface of the liquid toward the air discharge orifice, and filtering material within the last mentioned passage above the surface of the liquid, there being in the cylindrical wall of the specified member above the surface of the liquid near the junction of the mentioned passages an opening through which liquid carried into the filtering material by the upwardly traveling current of air may be discharged into the downwardly traveling current of air.

5. In an air cleaner, a body which is partly filled with a liquid, air intake and discharge orifices in the body, a generally cylindrical member which is spaced radially from the side wall of the body and divides the interior of the body into a passage through which air is conducted from the air intake orifice downwardly toward the surface of the liquid and a passage through which air is conducted upwardly from the surface of the liquid toward the air discharge orifice, filtering material within the last mentioned passage above the surface of the liquid, and a member which projects from the boundary of the last mentioned passage distant from the generally cylindrical member into the last mentioned passage above the surface of the liquid below the filtering material, the last specified member having in it near the boundary of the last mentioned passage distant from the generally cylindrical member an opening through which liquid carried by the current of air into the filtering material may be returned to the bottom of the body.

6. In an air cleaner, a body which is partly filled with a liquid, air intake and discharge orifices in the body, a generally cylindrical member which is spaced radially from the side wall of the body and divides the interior of the body into a passage through which air is conducted from the air intake orifice downwardly toward the surface of the liquid and a passage through which air is conducted upwardly from the surface of the liquid toward the air discharge orifice, filtering material within the last mentioned passage above the surface of the liquid, and a member with a portion which projects into the last mentioned passage above the surface of the liquid below the filtering material and a portion which projects downwardly from the first mentioned portion toward the surface of the liquid and directs air from the first mentioned to the last mentioned passage, the first mentioned portion of the last specified member having in it an opening through which liquid carried by the current of air into the filtering material may be returned to the bottom of the body.

7. In an air cleaner, a body which is partly filled with a liquid, air intake and discharge orifices in the body, a generally cylindrical member which is spaced radially from the side wall of the body and divides the interior of the body into a passage through which air is conducted from the air intake orifice downwardly toward the surface of the liquid and a passage through which air is conducted upwardly from the surface of the liquid toward the air discharge orifice, filtering material within the last mentioned passage above the surface of the liquid, the specified member having in it above the surface of the liquid near the junction of the mentioned passages an opening through which liquid carried into the filtering material by the upwardly traveling current of air may be discharged into the downwardly traveling current of air, and a baffle which directs air from the first mentioned into the last mentioned passage.

HERBERT G. KAMRATH.